(12) United States Patent
Li et al.

(10) Patent No.: US 10,732,342 B2
(45) Date of Patent: Aug. 4, 2020

(54) INDIRECT LUMINAIRE (71) Applicant: SIGNIFY HOLDING B.V., Eindhoven (NL)

(72) Inventors: Qin Li, Shanghai (CN); Qun Luo, Shanghai (CN); Kang Li, Shanghai (CN); Zhengyi Zheng, Shanghai (CN); Min Chen, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/323,837

(22) PCT Filed: Aug. 1, 2017

(86) PCT No.: PCT/EP2017/069435
§ 371 (c)(1),
(2) Date: Feb. 7, 2019

(87) PCT Pub. No.: WO2018/029042
PCT Pub. Date: Feb. 15, 2018

(65) Prior Publication Data
US 2019/0170927 A1    Jun. 6, 2019

(30) Foreign Application Priority Data

Aug. 10, 2016  (WO) ................ PCT/CN2016/094409
Sep. 7, 2016   (EP) ..................................... 16187542

(51) Int. Cl.
F21V 8/00          (2006.01)
(52) U.S. Cl.
CPC ......... *G02B 6/0045* (2013.01); *G02B 6/0001* (2013.01); *G02B 6/0055* (2013.01); *G02B 6/0068* (2013.01); *G02B 6/0088* (2013.01)

(58) Field of Classification Search
CPC .. G02B 6/0001; G02B 6/0011; G02B 6/0045; G02B 6/0055; G02B 6/0068; G02B 6/0088; F21V 7/0008
See application file for complete search history.

(56) References Cited

U.S. PATENT DOCUMENTS 5,704,703 A    1/1998  Yamada et al.
6,129,439 A   10/2000  Hou et al.
(Continued)

FOREIGN PATENT DOCUMENTS

CN         1617995 A     5/2005
CN       101681059 A     3/2010
(Continued)

*Primary Examiner* — Jong-Suk (James) Lee
*Assistant Examiner* — Christopher E Dunay
(74) *Attorney, Agent, or Firm* — Daniel J. Piotrowski (57) ABSTRACT A luminaire (1) is disclosed comprising at least one optical chamber (10) delimited by a light exit window (11) and a curved reflective surface (15) extending from the light exit window to a mounting surface (17) extending from the curved reflective surface towards the light exit window. Each optical chamber comprises a light source (20) mounted on the mounting surface; and a light guide (30) extending across part of the optical chamber. The light guide comprises a total internal reflection major surface (40) facing the light exit window; a further major surface (50) facing the curved reflective surface, said further major surface comprising a light outcoupling portion (51) comprising a plurality of light outcoupling structures (53); a first edge surface (60) optically coupled to the light source; and a further edge surface (70) opposite the first edge surface arranged to direct light towards the curved reflective surface.

15 Claims, 10 Drawing Sheets

(56) References Cited

U.S. PATENT DOCUMENTS

| | | | |
|---|---|---|---|
| 6,161,939 A * | 12/2000 | Bansbach | F21S 8/061 |
| | | | 362/223 |
| 8,534,901 B2 | 9/2013 | Panagotacos et al. | |
| 8,833,969 B2 | 9/2014 | Speier et al. | |
| 9,279,564 B1 * | 3/2016 | Householder | F21V 7/08 |
| 9,335,462 B2 | 5/2016 | York | |
| 10,060,599 B2 * | 8/2018 | Zampini | F21S 8/033 |
| 2007/0115674 A1 * | 5/2007 | Tessnow | G02B 6/0001 |
| | | | 362/459 |
| 2010/0149829 A1 * | 6/2010 | Kazaoka | F21V 7/005 |
| | | | 362/519 |
| 2014/0078765 A1 * | 3/2014 | Bungenstock | G02B 6/0006 |
| | | | 362/511 |
| 2014/0104868 A1 | 4/2014 | Speier et al. | |
| 2016/0053962 A1 * | 2/2016 | Akutsu | B60Q 1/0052 |
| | | | 362/511 |
| 2016/0131331 A1 * | 5/2016 | Parker | G02B 6/0001 |
| | | | 362/311.02 |
| 2017/0242182 A1 * | 8/2017 | Diana | G02B 6/0058 |
| 2017/0321865 A1 * | 11/2017 | Parker | F21V 7/0016 |
| 2018/0024289 A1 * | 1/2018 | Fattal | G02B 6/0028 |
| | | | 362/601 |
| 2018/0045385 A1 * | 2/2018 | Tyukhova | H05B 33/0872 |
| 2018/0098399 A1 * | 4/2018 | Takeshita | F21S 8/024 |
| 2018/0224596 A1 * | 8/2018 | Creasman | G02B 6/0091 |
| 2019/0195553 A1 * | 6/2019 | Schenkl | F21V 7/22 |

FOREIGN PATENT DOCUMENTS

| | | |
|---|---|---|
| CN | 101936507 A | 1/2011 |
| CN | 102099619 A | 6/2011 |
| CN | 103415739 A | 11/2013 |
| CN | 105121947 A | 12/2015 |
| EP | 1696260 B1 | 8/2006 |

* cited by examiner

INDIRECT LUMINAIRE

CROSS-REFERENCE TO PRIOR APPLICATIONS

This application is the U.S. National Phase application under 35 U.S.C. § 371 of International Application No. PCT/EP2017/069435, filed on Aug. 1, 2017 which claims the benefit of Chinese Patent Application No. PCT/CN2016/094409, filed on Aug. 10, 2016 and European Patent Application No. 16187542.2, filed Sep. 7, 2016. These applications are hereby incorporated by reference herein.

FIELD OF THE INVENTION

The present invention relates to a luminaire comprising at least one optical chamber delimited by a light exit window and a curved reflective surface extending from the light exit window to a mounting surface extending from the curved reflective surface towards the light exit window, each optical chamber comprising a light source mounted on the mounting surface.

BACKGROUND OF THE INVENTION

Solid state lighting (SSL), e.g. LED lighting, is rapidly gaining popularity because of its energy credentials and superior lifetime compared to traditional lighting, e.g. incandescent lighting, fluorescent lighting and halogen lighting. Nevertheless, market penetration of such SSL devices is not without challenges. For example, purchase cost of SSL devices is still higher than that of equivalent traditional light sources, even though the effective cost of such SSL devices is markedly lower due to their much longer lifetime, and this realisation by consumers is one of the reasons for the increased popularity of SSL.

A more serious challenge is to produce a luminous output with an SSL device that closely resembles the luminous output distribution of an equivalent traditional light source. Most SSL devices, e.g. LEDs, act as approximate point sources that produce a Lambertian luminous distribution. This makes it necessary to shape the luminous output of such SSL devices using optical elements, in order to achieve the desired luminous output distribution.

Moreover, direct visibility of the SSL elements in such devices should be avoided for reasons of glare, and for this reason many luminaires having a light exit window that is directly observable, e.g. ceiling-mounted luminaires such as troffers, deploy indirect illumination arrangements of the light exit window, in which the light emitted by the SSL elements is projected onto a light guide or a curved reflector, which deflect the incident light towards the light exit window, thereby hiding the SSL elements from direct view and reducing the glare experienced by someone directly looking at the luminaire.

However, such solutions each have their own drawbacks. For example, a light guide-based solution typically deploys outcoupling structures, e.g. arranged in a regular pattern along the light guide, to generate a relatively homogeneous luminous output with the luminaire. In order to avoid these outcoupling structures to be visible as light spots in the luminous output of the luminaire, such a luminaire typically further comprises a diffuser in the light exit window. Such an arrangement is therefore less suitable to achieve a satisfactory unified glare rating (UGR) due to the poor control over the beam angle produced by such luminaires.

A reflector-based solution works rather well if the overall size of the luminaire is relatively modest, but becomes less satisfactory, e.g. in terms of homogeneity of the luminous output, if the width of the luminaire increases, i.e. in the direction of the optical axis of the SSL elements. This is because the SSL elements need to project their luminous outputs over greater distances such that the regions of the curved reflector distal to the SSL elements become underexposed to the luminous output, causing a dimming effect in the luminous output of the luminaire in its periphery.

In another commonly deployed arrangement, the light exit window of the luminaire is directly lit by the SSL elements through respective lenses that convert the Lambertian luminous output of the SSL elements, e.g. into a batwing distribution or the like, with the light exit window including a diffuser to avoid a spotty appearance in the light exit window due to the SSL elements being individually noticeable. As will be understood from the foregoing, such an arrangement suffers from poor control over the beam shape produced with the luminaire due to the presence of the diffuser. In addition, it is not straightforward to achieve a compact design (limited thickness) of such an arrangement due to the stacking of the SSL elements, lenses and diffuser in the thickness direction.

US 2014/0104868 A1 discloses an illumination system is described including a plurality of illumination devices, each device including (i) light-emitting elements (LEEs) arranged along a corresponding first axis; (ii) an optical extractor extending along a corresponding longitudinal axis parallel to the first axis; and (iii) a light guide positioned to receive at a first end of the light guide light emitted by the LEEs and guide it to a second end of the light guide. The optical extractor is optically coupled to the light guide at the second end and is shaped to redirect the light guided by the light guide into a range of angles on either side of the light guide. The illumination devices are connected to each other to form a polygon such that the longitudinal axes of the connected illumination devices lie in a common plane. Such an illumination system is rather costly due to the large number of components it requires, e.g. the additional optical extractor, which further increases the form factor (e.g. thickness) of the illumination system.

SUMMARY OF THE INVENTION

The present invention seeks to provide a luminaire that can achieve a homogeneous luminous output with a good UGR using few components and a desirable form factor.

According to an aspect, there is provided a luminaire comprising at least one optical chamber delimited by a light exit window and a curved reflective surface extending from the light exit window to a mounting surface extending from the curved reflective surface towards the light exit window, each optical chamber comprising a light source mounted on the mounting surface; and a light guide extending across part of the optical chamber, comprising: a total internal reflection major surface facing the light exit window; a further major surface facing the curved reflective surface, said further major surface comprising a light outcoupling portion comprising a plurality of light outcoupling structures; a first edge surface optically coupled to the light source; and a further edge surface opposite the first edge surface arranged to direct light towards the curved reflective surface.

The provision of such a light guide in the luminaire ensures that the luminous output of the light source, e.g. a SSL source, is homogeneously distributed towards different regions of the curved reflective surface. Specifically, the light outcoupling portion distributes a portion of the luminous output to a region of the curved reflective surface proximal to the light source and the further edge surface distributes a further portion of the luminous output to a region of the curved reflective surface distal to the light source, such that distal regions of the curved reflective surface may receive sufficient light from the light source, even in configurations where such distal regions are relatively far removed from the light source, e.g. in luminaires elongated along the optical axis of the light source.

The further major surface may further comprise a total internal reflection portion in between the mounting surface and the light outcoupling portion to avoid excessive emission of light from the light guide proximal to the light source in order to ensure a satisfactory homogeneity in the luminous output produced by the luminaire. For example, when a ratio of the length of the light outcoupling portion and the length of the total internal reflection portion along the light guide is in a range of 1:5 to 1:30, a good homogeneity in the luminous output produced by the luminaire is achieved.

Any suitable outcoupling structures may be used in the light outcoupling portion. In an embodiment, the light outcoupling structures are prisms such as Fresnel prisms, which has the advantage that the light guide may be formed in a single step, e.g. through injection molding or the like, without having to apply separate light outcoupling structures, e.g. scattering dots such as white paint dots, laser printed (white) dots or the like although such alternative light outcoupling structures are of course equally feasible. Each prism may have a width in a range of 1 to 4 mm and/or a vertex angle in a range of 70 to 105° to ensure that the outcoupled light profile generated by these prisms has a suitable profile.

The shape of the further edge surface may be any shape suitable for guiding light rays towards the distal region of the curved reflective surface. For example, the further edge surface may comprises a micro lens to deflect, e.g. refract, the light rays towards the curved reflective surface, or alternatively, the further edge surface may comprise a freeform surface.

In an embodiment, the further edge surface comprises a slanted surface portion under an angle in a range of 60 to 80° with the total internal reflection surface. The angle may be optimized depending on the dimensions of the luminaire, e.g. an elongation dimension along the optical axis of the light source. The further edge surface in this embodiment may comprise a further slanted surface portion under an angle in a range of 120 to 160° with the slanted surface portion, the further slanted surface portion extending from the total internal reflection surface and the slanted surface portion extending from the further slanted surface portion to the further major surface. The further slanted surface may act to reflect incident light rays towards the slanted surface portion, thereby further improving the efficiency of the light guide, in particular the ability of the light guide to guide light towards the far regions (distal regions) of the curved reflective surface.

In an embodiment, the optical chamber has a width defined from a light emission surface of the light source to an end point of the curved reflective surface proximal to the light exit window; the light guide has a length between the first edge surface and the further edge surface; and a ratio between the width and the length is in a range of 2:1-5:1. The light guide is spatially away from the curved reflective surface at a substantial distance. The wording "substantial" for this distance means its value is big enough that being comparable with the thickness of the light guide, for example, equal to or larger than the thickness value. Thus, because there is substantial distance between the light guide and the curved reflective surface at any directions, after the light leaves the light guide and is reflected by the curved reflective surface, more light goes through the void of the optical chamber toward the light exit window while less light goes back to the light guide again. Less light passing through the light guide again, means that the system has less energy loss due to the absorption of material, or in other words, has higher optical efficiency.

In a preferable embodiment, the distance between the light guide and the curved reflective surface is larger than a distance between the light guide and the light exit window. This ensures the generation of a particularly homogeneous luminous output with the luminaire having excellent beam characteristics and UGR.

Additionally or alternatively, the mounting surface may have a height, in which a ratio between the width and the height is in a range of 1:1-5:1 to achieve a particularly compact luminaire.

The luminaire may have a plurality of such optical chambers. For example, the luminaire may comprise a pair of optical chambers separated by a compartment for housing one or more luminaire components, optionally wherein the optical chambers are mirror images of each other.

The luminaire according to embodiments of the present invention may be any suitable type of luminaire. A ceiling mounted and luminaire or troffer is particularly mentioned due to the fact that such luminaires may particularly benefit from the light output characteristics achieved by the luminaire according to such embodiments.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

It should be understood that the Figures are merely schematic and are not drawn to scale. It should also be understood that the same reference numerals are used throughout the Figures to indicate the same or similar parts.

Figure 1:
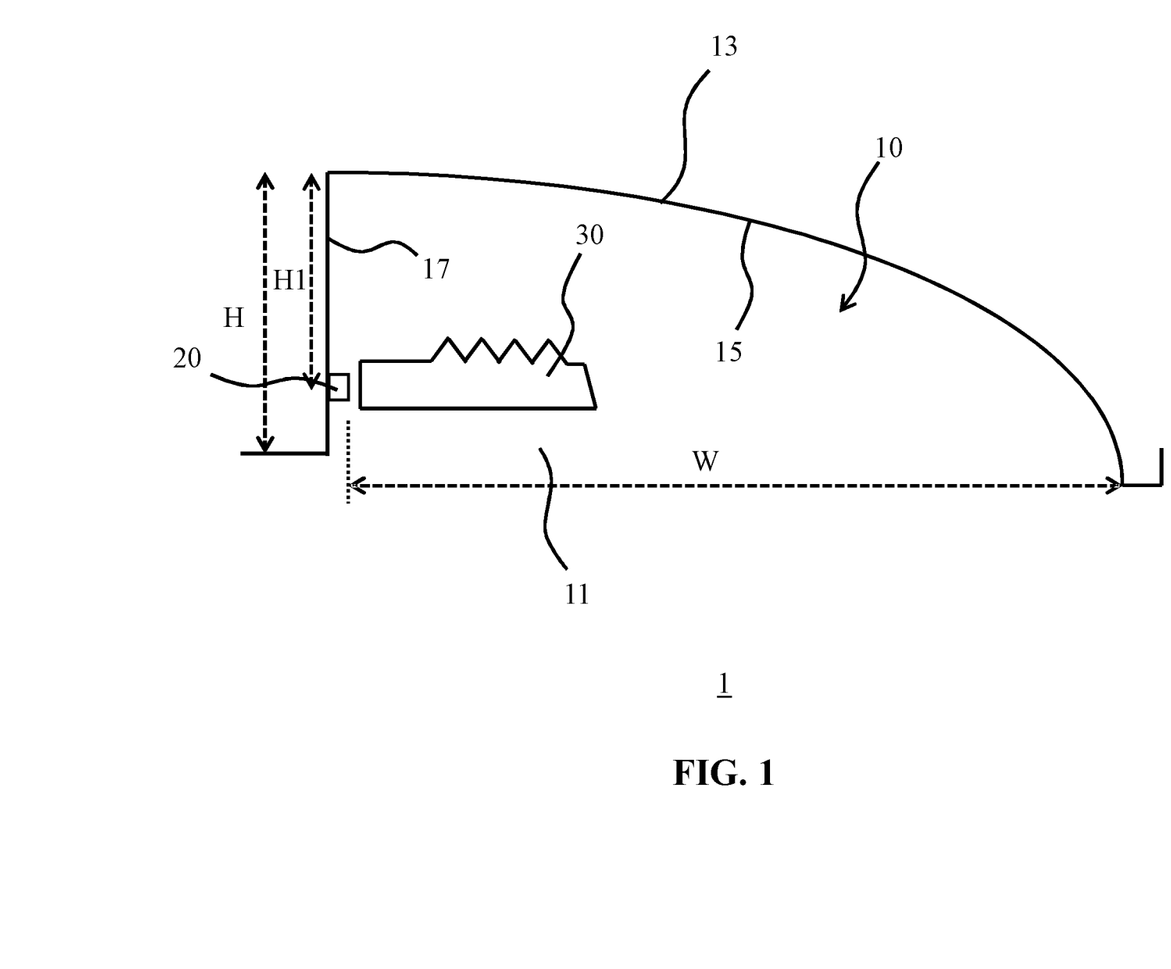
FIG. 1 schematically depicts a luminaire according to an embodiment of the present invention.

FIG. 1 schematically depicts a cross-sectional view of a luminaire 1 or part thereof, e.g. one half of such a luminaire 1. The luminaire 1 comprises at least one optical chamber 10 delimited by a light exit window 11 at the bottom of the optical chamber 10 in the orientation of the luminaire 1 as shown in FIG. 1. The light exit window 11 may be an open space or may be at least partially defined by a transparent or translucent body, e.g. a cover plate or the like, which may be made of any suitable material, e.g. glass or an optical grade polymer such as polycarbonate (PC), polyethylene terephthalate (PET), poly (methyl methacrylate) (PMMA) or any other suitable material. An upper region of the optical chamber 10 is delimited by a curved reflective surface 15, which may form part of a housing 13 or alternatively may be a separate structure, e.g. a reflector attached to the housing 13. The reflective surface 15 may be any suitable curved reflective surface, e.g. a specularly or scattering reflective surface or the like, which may be formed of any suitable reflective material, e.g. a (polished) metal reflector, a reflective film or coating, and so on. The curved reflective surface 15 may have any suitable shape, e.g. a free-form shape, parabolic shape, and so on. The curved reflective surface 15 may be shaped in accordance with the desired optical performance of the luminaire 1, e.g. may be shaped such that when the curved reflective surface 15 cooperates with the light guide 30 to be described below, the luminaire 1 obtains the desired optical performance. The curved reflective surface 15 extends from the light exit window 11 to a mounting surface 17, which mounting surface 17 extends from the curved reflective surface 15 towards the light exit window 11. The mounting surface 17 may be realized in any suitable material and in any suitable manner. For example, the mounting surface 17 may form an integral part of the housing 13 or alternatively may be attached, e.g. screwed or welded, to the housing 17.

At least one light source 20, e.g. a solid state light source such as LED, is mounted on the mounting surface 17 such that the light source 20 is arranged to emit its luminous output towards the optical chamber 10. In at least some embodiments, the light source 20 has an optical axis (not shown) that runs substantially parallel to the major plane of the light exit window 11. In some embodiments, the mounting surface 17 is at least partially made of metal or a metal alloy, such that the mounting surface 17 may act as a heatsink for the at least one light source 20 mounted thereon. Any suitable light source, e.g. any suitable type of LED, may be used as the light source 20. In case of the luminaire 1 comprising a plurality of light sources 20 in each optical chamber 10, these light sources may be identical or may be different from each other, e.g. LEDs producing different coloured luminous outputs, white light outputs with different colour temperatures, and so on. In the latter scenario, each light source 20 may be individually addressable such that the luminous output of the luminaire 1 may be configurable. However, in order to achieve the homogeneous luminous output across the entirety of the light exit window 11, it is preferred that all light sources 20 are identical and arranged to be switched on or off in unison.

Each light source 20 is optically coupled to a light guide 30 that extends across a part of the optical chamber 10, i.e. along part of the width W of the optical chamber 10 as defined by the line at which a virtual plane coinciding with the light emission surface of the light source 20 meets the major plane of the light exit window 11 and the line at which the curved reflective surface 15 meets the light exit window 11, as will be explained in further detail below. The light guide 30 may be provided in the form of a plate. In such an embodiment, multiple light sources 20 may be optically coupled to the same light guide 30 although in alternative embodiments in which a plurality of light sources 20 is arranged in the optical chamber 10, at least some of the light sources 20 are associated with separate light guides 30.

Figure 2:
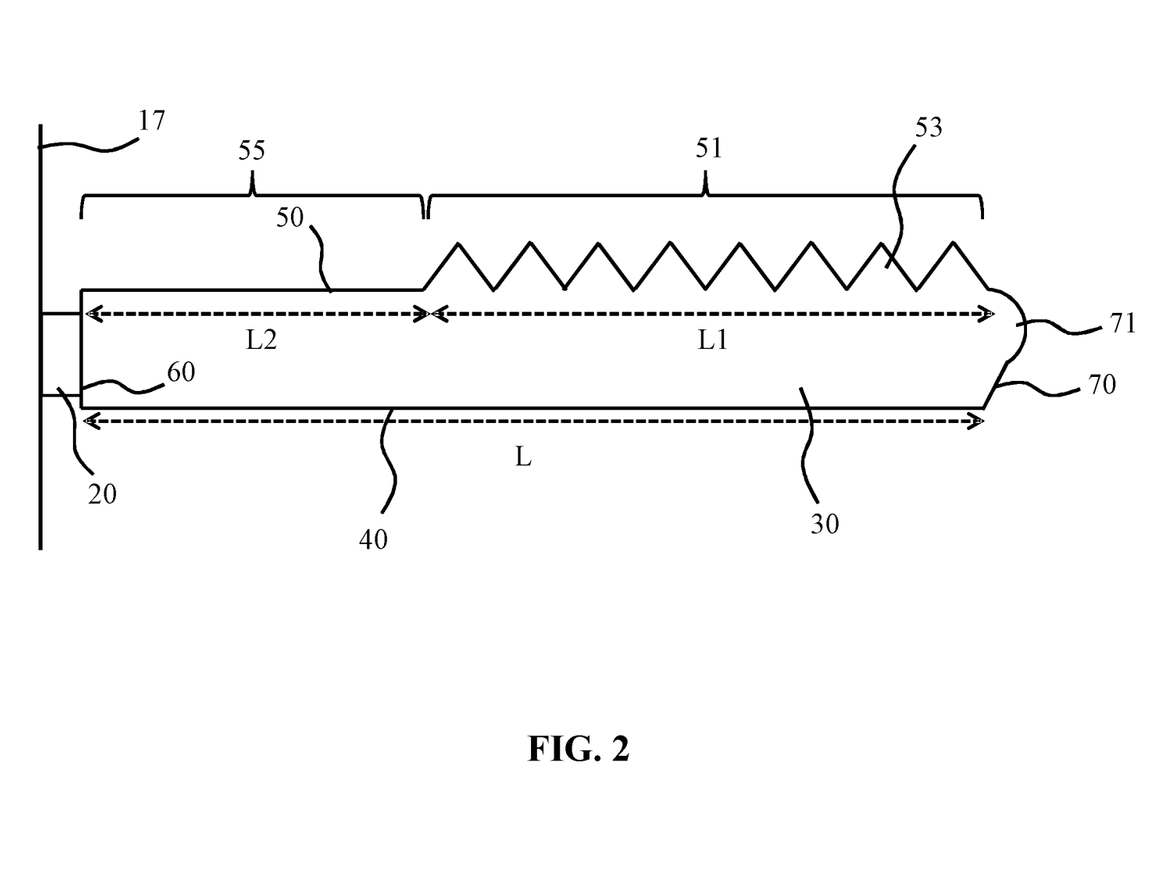
FIG. 2 schematically depicts an aspect of a luminaire according to an embodiment of the present invention.

An example embodiment of such a light guide 30 is schematically depicted in FIG. 2. The light guide 30 comprises a total internal reflection (TIR) major surface 40 facing the light exit window 11 and a further major surface 50 opposite the major surface 40 facing the curved reflective surface. The light guide 30 further comprises a first edge surface 60 optically coupled to the light source 20 that extends between the major surface 40 and the further major surface 50 such that substantially all light emitted by the light source 20 is coupled into the light guide 30.

The TIR major surface 40 prevents light emitted by the light source 20 into the light guide 30 from directly exiting the luminaire 1 through the light exit window 11 based on the well-known principle of total internal reflection, at which light incident at such a surface under an angle that is smaller than the so-called critical angle (of incidence) is reflected by the surface, typically through the difference of refractive index of the material of the light guide 30 and the medium outside the major surface 40, e.g. air. The material of the light guide 30 is typically chosen such that its refractive index ensures that substantially all light emitted by the light source 20 and directly incident on the major surface 40 is reflected by this surface. For example, the light guide 30 may be made of a suitable optical grade polymer such as PC, PET or PMMA although many more suitable materials will be immediately apparent to the skilled person.

The further major surface 50 comprises a light outcoupling portion 51 comprising a plurality of light outcoupling structures 53 that are arranged to couple light emitted by the light source 20 and traveling along the light guide 30 out of the light guide 30 and towards a first region of the curved reflective surface 15 of the optical chamber 10 such that the outcoupled light may be reflected by the curved reflective surface 15 towards the light exit window 11. In an embodiment, the light outcoupling structures 53 form an integral part of the light guide 30 and are formed as prisms in the further major surface 50. Such prims for example may be Fresnel prisms or any other suitable type of prisms that can achieve such outcoupling. Such prisms may have any suitable dimension, for example a width in the range of 1-4 mm and/or a vertex angle in the range of 70-105° in order to ensure the desired outcoupling characteristics of the prisms. Alternatively, the light outcoupling portion 51 may carry a plurality of outcoupling structures 53, e.g. white paint dots or the like, which may be formed in any suitable manner, e.g. through laser printing, dot printing, or the outcoupling structures 53 may be made of a diffusive material causing the desired outcoupling. As such outcoupling structures 53 are well-known per se, this will not be explained in further detail.

The further major surface 50 may further comprise a total internal reflection portion 55 in between the mounting surface 17, i.e. the first edge surface 60 and the light outcoupling portion 51 such that the light guide 30 may comprise opposing total internal reflection surfaces 40, 55 proximal to the light source 20. This for instance may be advantageous in order to prevent too much light being coupled out of the light guide 30 by the outcoupling structures 53, e.g. by the light outcoupling portion 51 covering too large an area of the further major surface 50. Also, because the outcoupling structures 53 will couple out light in a direction having a directional component towards the light source 20 as well as in a direction having a directional components away from the light source 20, this may prevent regions of the curved reflective surface 15 immediately adjacent to the mounting surface 17 from becoming overexposed.

In an embodiment, the total internal reflection portion 55 may extend from the first edge surface 60 to the light outcoupling portion 51 over a length L2, whereas the light outcoupling portion 51 may extend from the total internal reflection portion 55 to a further edge surface 70 opposite the first edge surface 60 over a length L1. A ratio L1:L2 may be in the range 1:5-1:30 to achieve an acceptable uniformity of the luminous output of the luminaire 1. Preferably, this ratio is kept as small as possible, e.g. in a range of 1:5-1:15, as for smaller ratios a particularly good homogeneity in the luminaire's luminous output is achieved.

The total length L of the light guide 30, e.g. L=L1+L2, and the total width W of the optical chamber 10, i.e. L:W, may be in a range of 1:2-1:5. The light guide 30 is spatially away from the curved reflective surface 15 at a substantial distance H1. Thus, there is substantial distance between the light guide and the curved reflective surface at both horizontal direction and vertical direction as shown in FIG. 1. After the light leaves the light guide and is reflected by the curved reflective surface, more light goes through the void of the optical chamber toward the light exit window while less light goes back to the light guide again. Because of the less light passing through the light guide again, the system has less energy loss due to the absorption of material, in other words, has higher optical efficiency than the conventional lighting devices. Similarly, the mounting surface 17 may have a height H, wherein a ratio between the height H and the total width W of the optical chamber 10 is in the range of 1:1-1:5 in order to ensure a particularly desired compactness of the luminaire 1 and a particularly desired homogeneity in the luminous output of the luminaire 1.

The further edge surface 70 is arranged such that light emitted by the light source 20 and travelling through the light guide 30 incident on the further edge surface 70 is directed predominantly away from the light exit surface 10 towards the curved reflective surface 15. More precisely, the light outcoupling portion 51 is typically arranged to couple light originating from the light source 20 out of the light guide 30 predominantly towards a first region of the curved reflecting surface 15 proximal to the light source 20, whereas the further edge surface 70 is typically arranged to couple light originating from the light source 20 out of the light guide 30 predominantly towards a second region of the curved reflecting surface 15 distal to the light source 20, i.e. the light outcoupling portion 51 and the further edge surface 70 are typically arranged to redirect light originating from the light source 20 towards different regions of the curved reflecting surface 15, although it should be understood that an overlap may exist between the first region and the second region of the curved reflecting surface 15.

The shape of the further edge surface 70 is not particularly limited as any suitable surface shape that achieves the desired redirection of the majority of the light from the light source 20 incident on the further edge surface 70 towards the second region of the curved reflective portion 15 may be deployed. For example, in the example embodiment depicted in FIG. 2, the further edge surface 70 comprises a micro lens 71 to implement the desired redirection of the light from the light source 20 incident on the further edge surface 70 towards the second region of the curved reflective portion 15.

Figure 3:
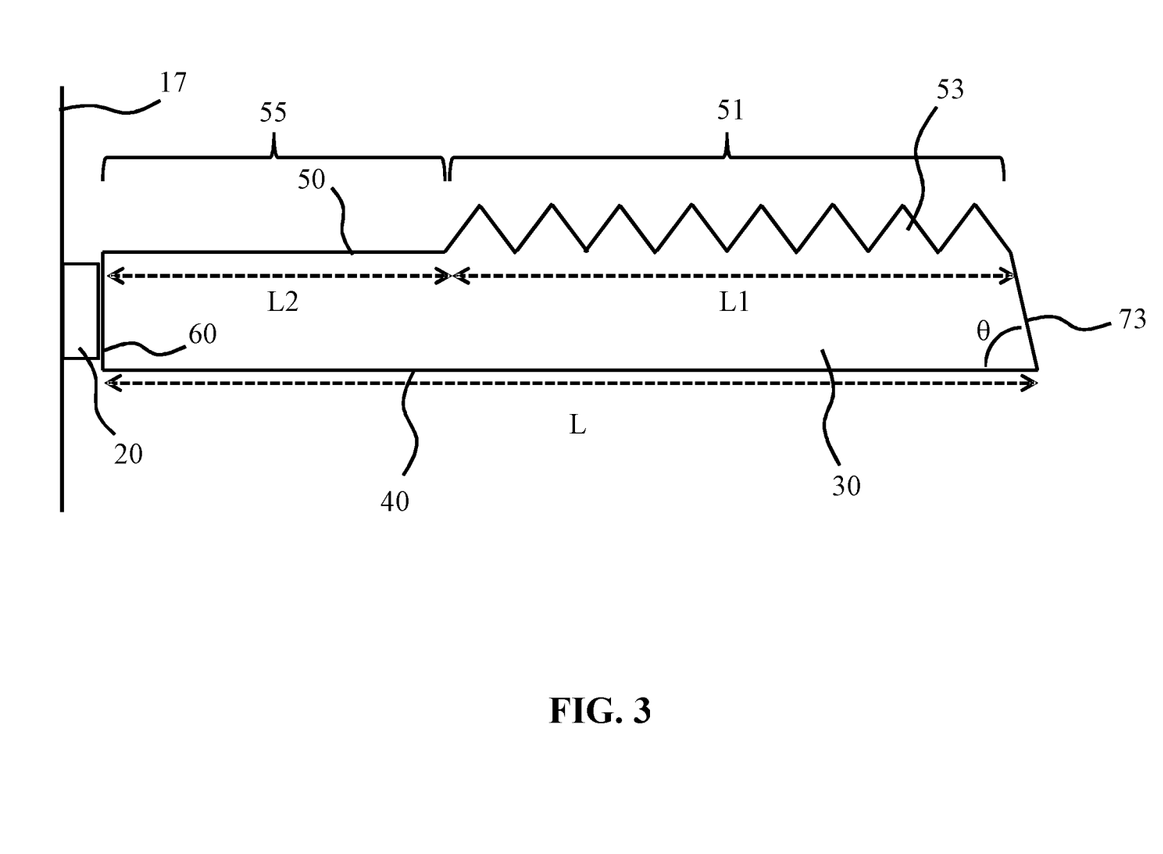
FIG. 3 schematically depicts an aspect of a luminaire according to another embodiment of the present invention.

FIG. 3 schematically depicts a cross-sectional view of an alternative example embodiment of the light guide 30, in which the further edge surface 70 comprises a slanted surface portion 73 under an angle θ in a range of 60-80° with the total internal reflection surface 40 in order to redirect the light from the light source 20 incident on the slanted surface portion 73 towards the appropriate region of the curved reflective portion 15. As will be readily understood by the skilled person, the angle θ may be optimized for example as a function of the ratio between the total length L of the light guide 30 and the total width W of the optical chamber 10 to ensure that the appropriate region of the curved reflective portion 15 and/or an appropriate spread angle of light being coupled out of the light guide 30 by the further edge surface 70 is achieved.

Figure 4:
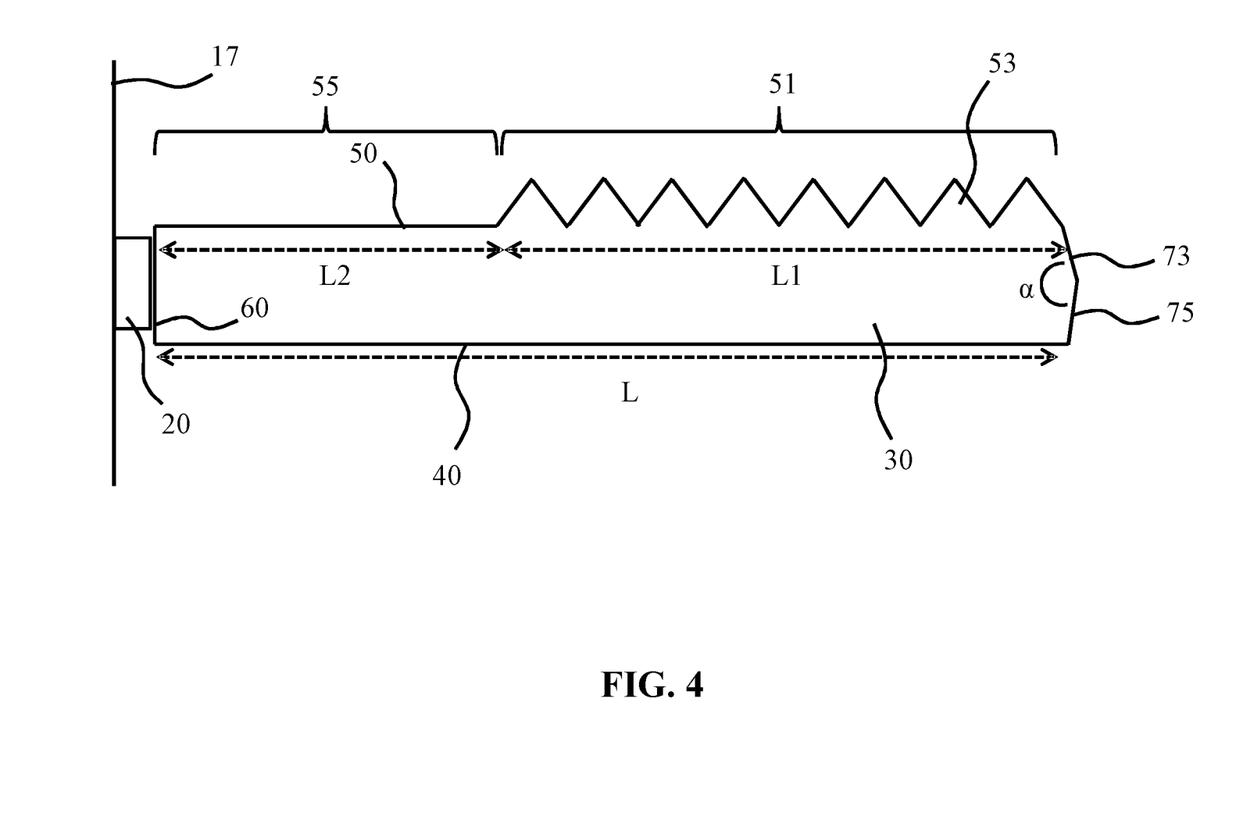
FIG. 4 schematically depicts an aspect of a luminaire according to yet another embodiment of the present invention.

FIG. 4 schematically depicts a cross-sectional view of another alternative example embodiment of the light guide 30, in which the further edge surface 70 comprises a further slanted surface portion 75 under an angle α in a range of 120-160° with the slanted surface portion 73, the further slanted surface portion 75 extending from the total internal reflection surface 40 and the slanted surface portion 73 extending from the further slanted surface portion to the further major surface 50. The further slanted surface portion 75 may reflect some of the incident light towards the slanted surface portion 73 and/or the light outcoupling portion 51 or alternatively may couple out some of the incident light towards the light exit window 10. As will be immediately apparent to the skilled person, the angle α may be optimized for example as a function of the ratio between the total length L of the light guide 30 and the total width W of the optical chamber 10 to ensure that the appropriate region of the curved reflective portion 15 and/or an appropriate spread angle of light being coupled out of the light guide 30 by the further edge surface 70 is achieved.

At this point, it is noted that the above example embodiments of the further edge surface 70 are intended as non-limiting examples only and that any suitable surface shape for the further edge surface 70, e.g. any suitable free-form shape, may be contemplated.

Figure 5:
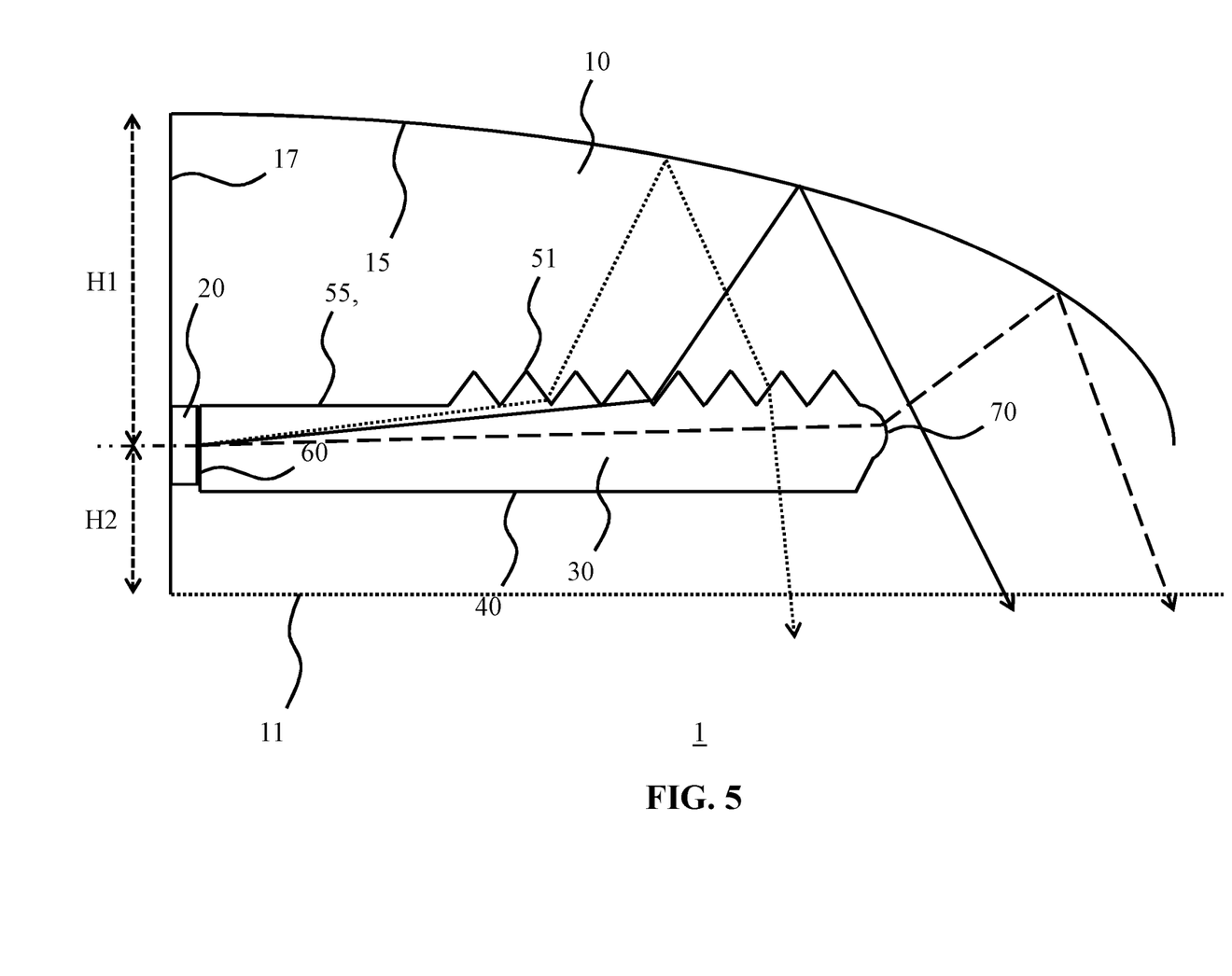
FIG. 5 schematically depicts an optical principle of a luminaire according to an embodiment of the present invention.

The optical principle of the luminaire 1 according to embodiments of the present invention is now explained in further detail with the aid of FIG. 5, which schematically depicts a cross-sectional view of at least part of the luminaire 1. The light emitted by the one or more light sources 20, e.g. SSL sources such as LEDs, arranged along the first edge surface 60 of the light guide 30, is coupled into the light guide 30 through the optical coupling between the one or more light sources 20 and the first edge surface 60. Such an optical coupling for example may be achieved by bringing the one or more light sources 20 into physical contact with the first edge surface 60 or by allowing for an air gap between the one or more light sources 20 and the first edge surface 60 that is small enough such that substantially all light emitted by the one or more light sources 20 is coupled into the light guide 30. The light coupled into the light guide 30 travels through the light guide in between the TIR surface 40 and the TIR surface portion 55 opposite the TIR surface 40, wherein the light from the one or more light sources 20 is typically incident on the TIR surface 40 and the TIR surface portion 55 under an angle below the respective critical angles of the TIR surface 40 and the TIR surface portion 55, such that substantially all light emitted by the one or more light sources 20 travels through the light guide 30 until this light reaches the light outcoupling portion 51.

At this point, at least some of the light incident on the light outcoupling portion 51 is coupled out of the light guide 30 towards the curved reflective surface 15, which outcoupled light may comprise a first fraction symbolized by the finely dashed arrow that is reflected by the curved reflective surface 15 towards the light guide 30, which first fraction may re-enter the light guide 30 through the further major surface 50, e.g. through the light outcoupling portion 51, where this first fraction travels towards the TIR surface 40. This first fraction is typically incident on the TIR surface 40 under an angle larger than the critical angle of the TIR surface 40, such that this first fraction substantially exits the light guide 30 through the TIR surface 40 and subsequently exits the luminaire 1 to a first region of the light exit window 11 below the light guide 30 in the orientation of the luminaire 1 as schematically depicted in FIG. 5.

A second fraction of the light exiting the light guide 30 through the light outcoupling portion 51 may be reflected by the curved reflective surface 15 towards a second region of the light exit window 11 as symbolized by the solid arrow, which second region lies adjacent to the first region of the light exit window 11, i.e. lies laterally displaced relative to the light guide 30 in the orientation of the luminaire 1 as schematically depicted in FIG. 5. A third fraction of the light travelling through the light guide 30 exits the light guide 30 through the further edge surface 70, as symbolized by the coarsely dashed arrow. The further edge surface 70 redirects this third fraction towards a region of the curved reflective surface 15 (distal to the one or more light sources 20) such that the curved reflective surface 15 reflects this third fraction towards a third region of the light exit window 11 adjacent to the second region of the light exit window 11 such that this second region lies in between the first region in the third region.

The distance H1 between the light guide 3 and the curved reflective surface 15 is larger than a distance H2 between the light guide 3 and the light exit window 11. Hence, the second fraction and third fraction of light which have less light loss override the first fraction of light which has to suffer with more light loss because re-entering the light guide 30.

In this manner, the light guide 30 ensures that different regions of the light exit window 11 are indirectly illuminated by light emitted by the one or more light sources 20. As will be immediately understood by the skilled person based for example on the foregoing description of the light guide 30, the light guide 30 and the optical chamber 10 may be dimensioned such that each of these respective regions of the light exit window 11 receive a luminous flux such that a substantially homogeneous luminous distribution across the light exit window 11 is achieved, e.g. a conventional luminous distribution. Such dimensions may be achieved using well-known optical design techniques, and this design process is therefore not explained in further detail for the sake of brevity only.

The optical principle of embodiments of the present invention may be deployed in any suitable type of luminaire 1, e.g. indoor luminaires, outdoor luminaires, spotlight luminaires, ceiling-mounted luminaires, e.g. troffers, and so on. Such luminaires may comprise a single optical chamber 10 or may comprise multiple optical chambers 10.

Figure 6:
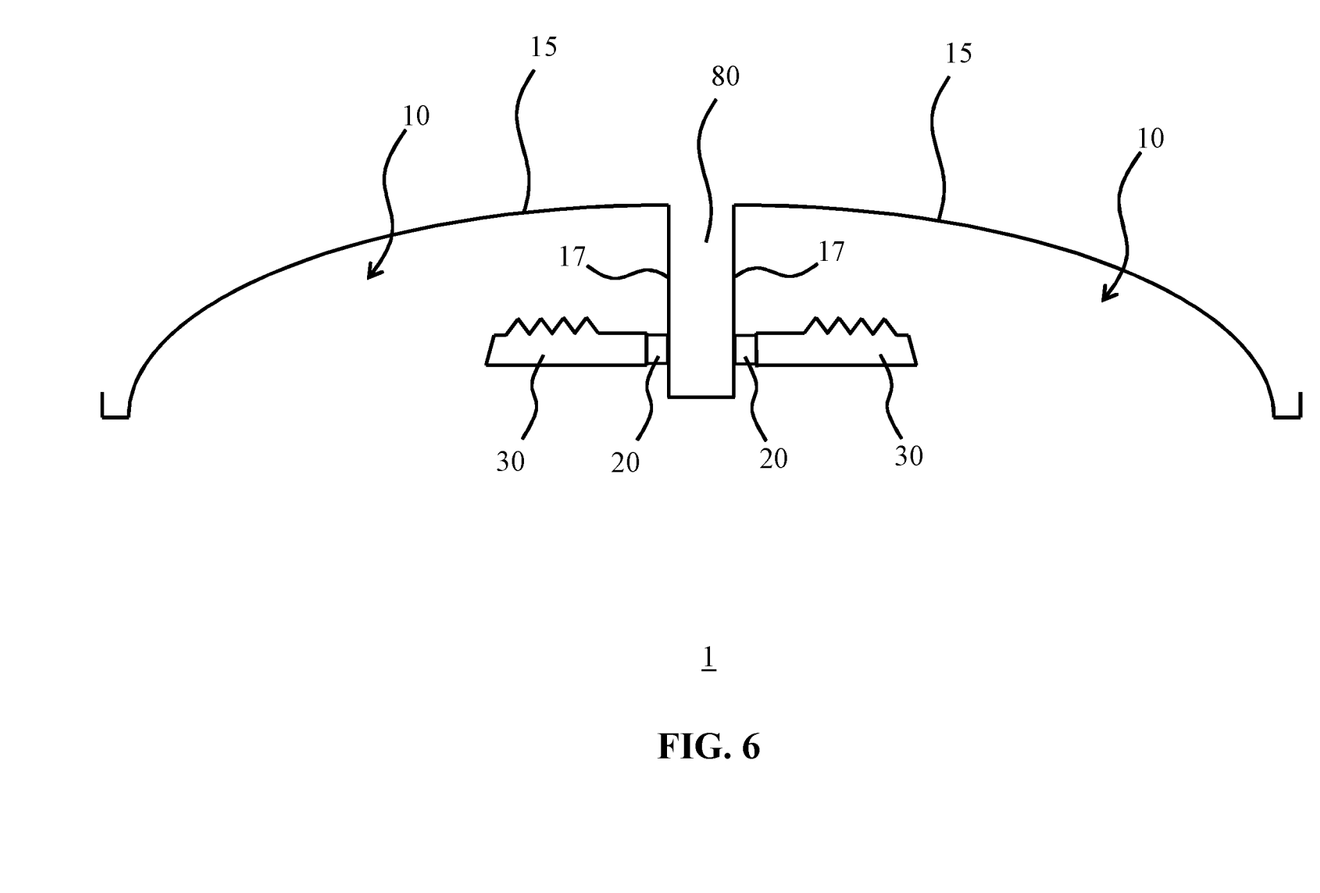
FIG. 6 schematically depicts a luminaire according to a further embodiment of the present invention.
Figure 7:
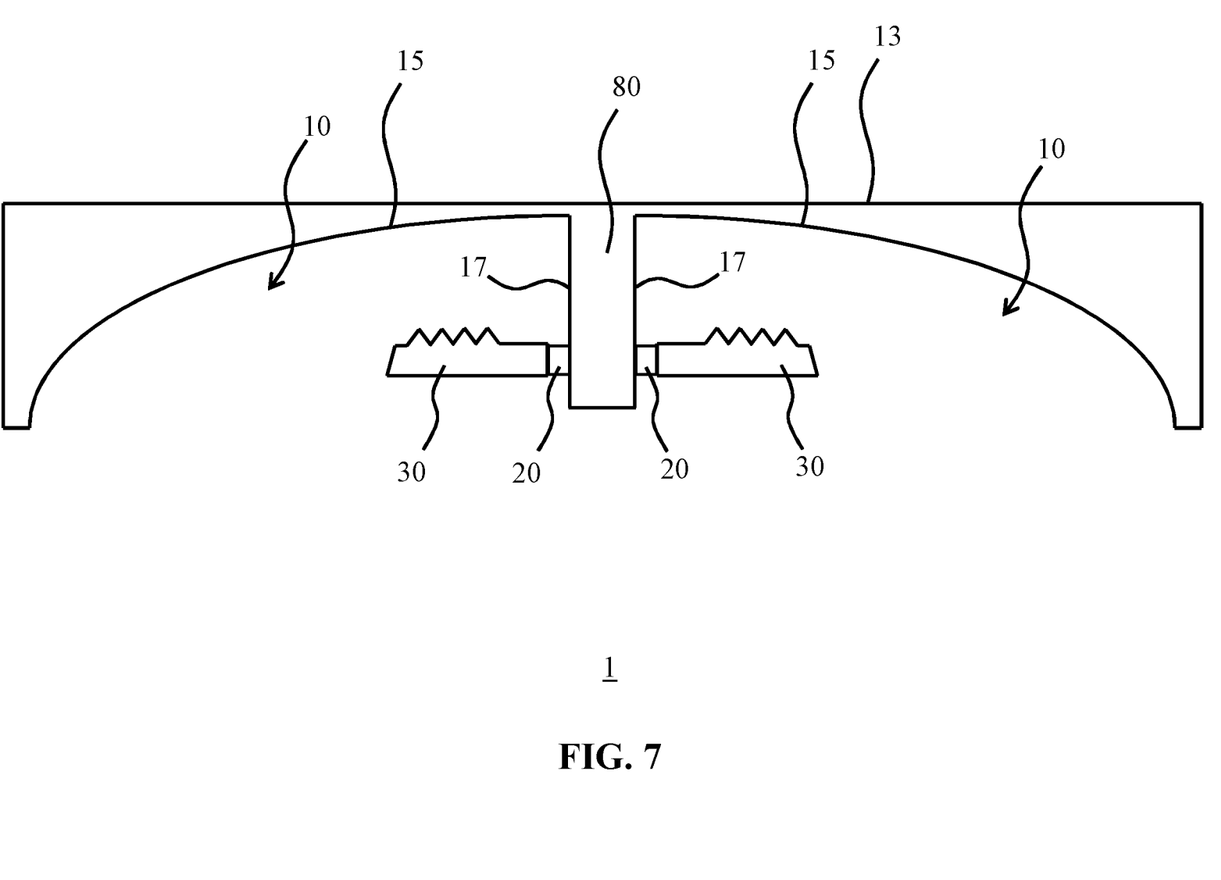
FIG. 7 schematically depicts a luminaire according to a still further embodiment of the present invention.

FIG. 6 schematically depicts an example embodiment of the luminaire 1 comprising a pair of optical chambers 10, each comprising the optical arrangement as described above, i.e. one or more light sources 20 optically coupled to a light guide 30, e.g. a light guide plate, extending into the optical chamber 10 as previously described. The optical chambers 10 may be mirror images of each other although this is not strictly necessary. In FIG. 6, the curved reflective surfaces 15 define the housing of the luminaire 1. Alternatively, as schematically depicted in FIG. 7, the curved reflective surfaces 15 may define part of the housing 13, e.g. may form an inner surface of the housing 13, e.g. as a reflective structure such as a mirror or a coating or the like on the housing 13.

Figure 8:
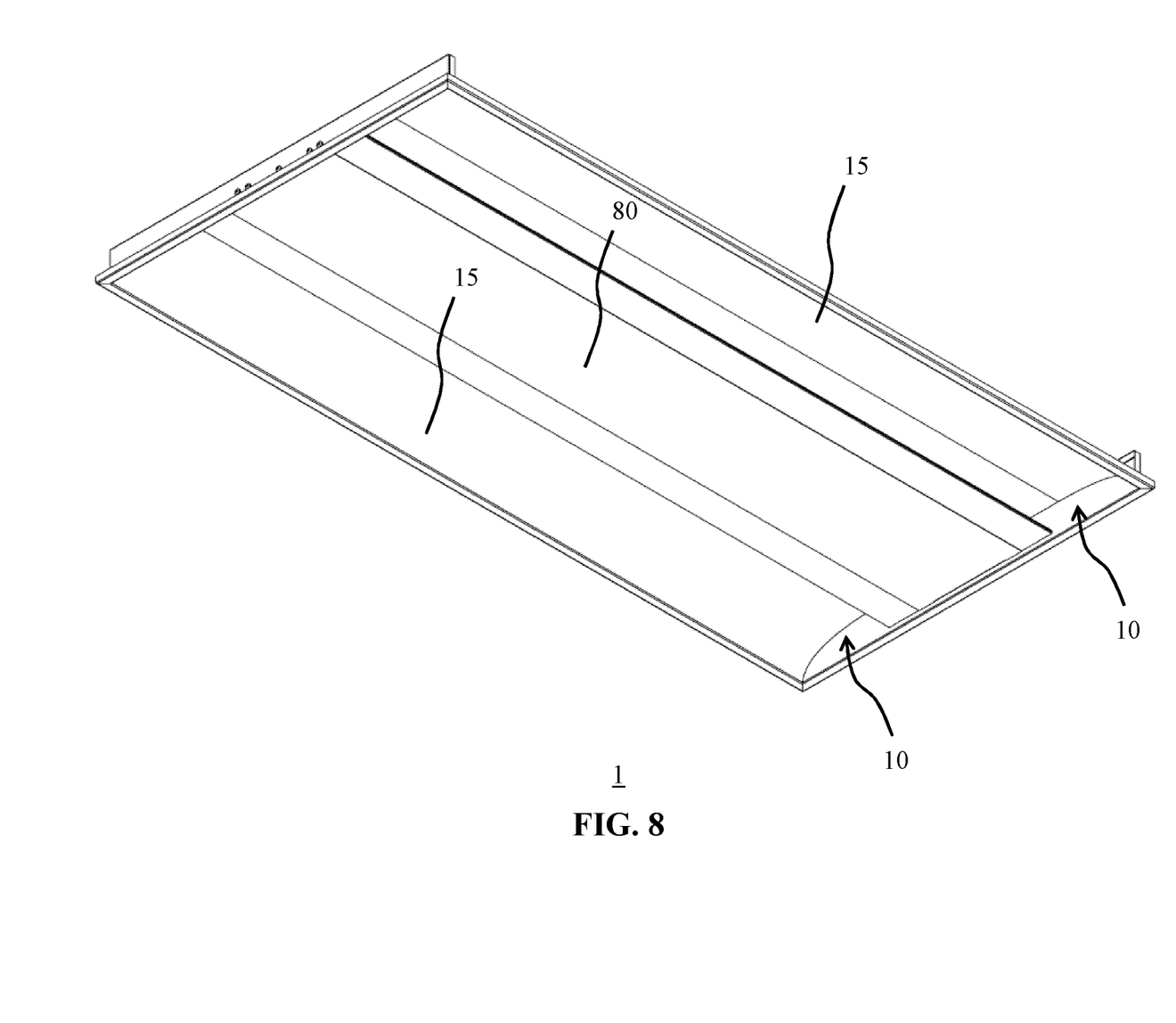
FIG. 8 schematically depicts a perspective view of a luminaire according to a further embodiment of the present invention.

A compartment 80 for housing one or more luminaire components, e.g. ballasts, driver circuits, and the like, may be located in between the pair of optical chambers 10 of the luminaire 1. This for instance is schematically depicted in the perspective (top) view of the luminaire 1 in FIG. 8.

The respective optical chambers 10 may define separate elongate optical chambers of a ceiling mounted luminaire or troffer, in which the optical chambers 10 may be elongated along the first edge surface 60 of the light guide 30, e.g. in the form of a plate. In an embodiment, each optical chamber 10 comprises a row of light sources 20 on the mounting surface 17 in the elongation direction of the optical chamber 10, which row of light sources 20 is optically coupled to the corresponding light guide 30 through its first edge surface 60. Such an arrangement is schematically depicted in the perspective view of the luminaire 1 in FIG. 9.

Figure 9:
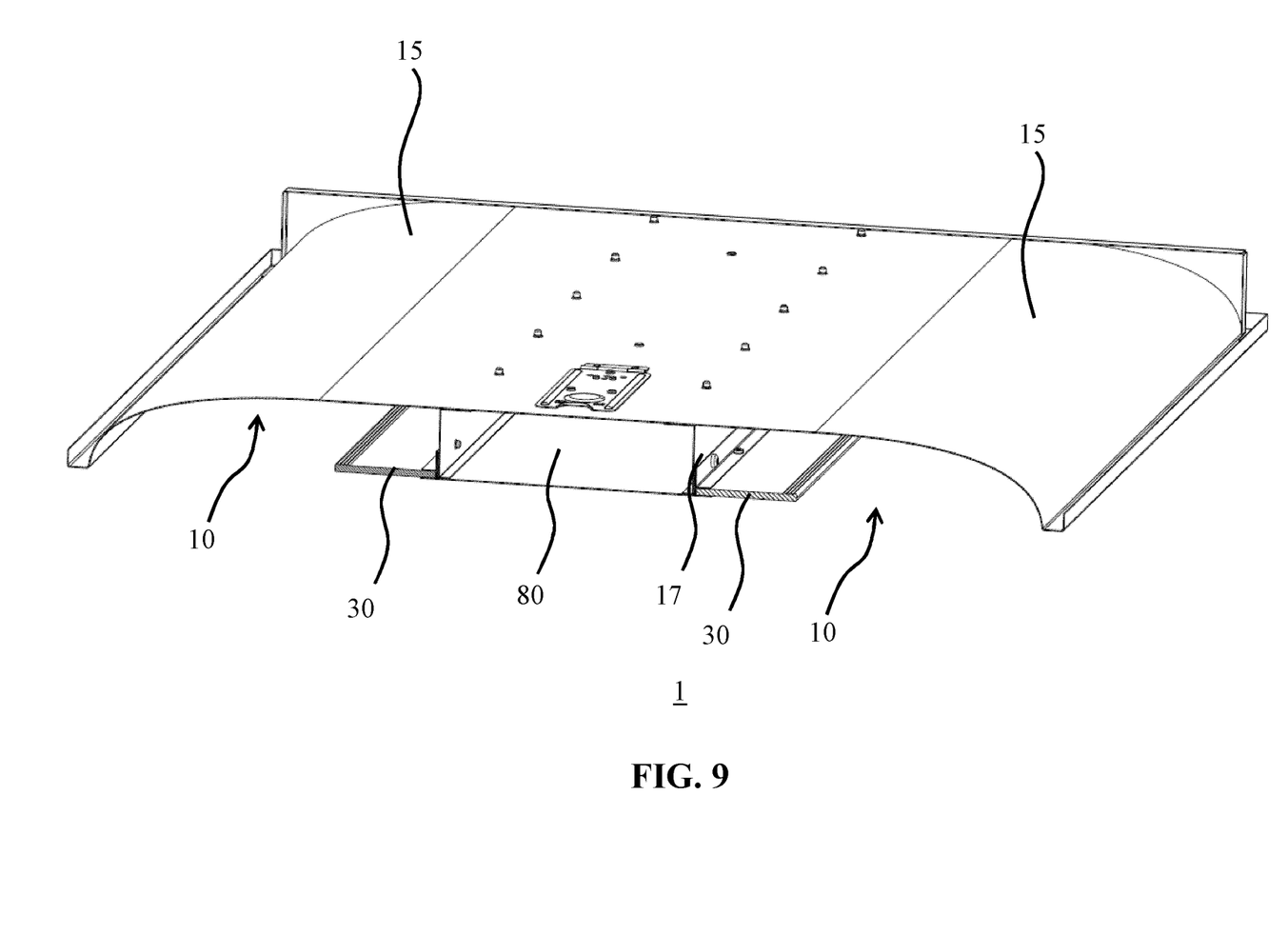
FIG. 9 schematically depicts a further perspective view of a luminaire according to a further embodiment of the present invention.
Figure 10:
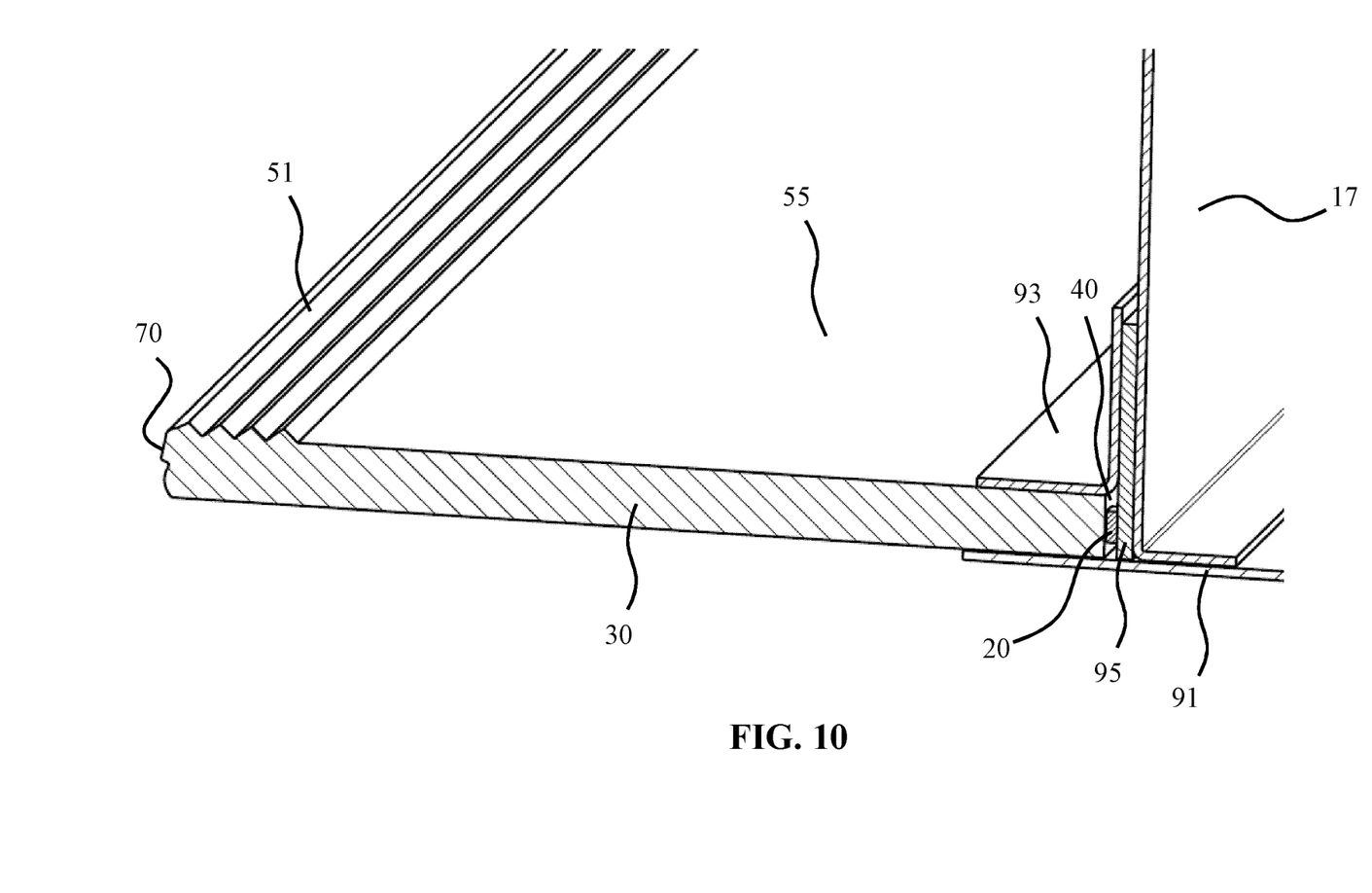
FIG. 10 schematically depicts a perspective view of an aspect of a luminaire according to a further embodiment of the present invention.

FIG. 10 schematically depicts a part of the perspective view of FIG. 9 in more detail. In this embodiment, an example arrangement for affixing the light guide 30, here in the form of an elongated plate, against the mounting surface 17 carrying the row of light sources 20 (only a single light source 20 can be seen in this view) is shown. A support member 95, e.g. a carrier of the light sources 20 such as a PCB, MCPCB or the like, or a separate support member 95, may be mounted against the mounting surface 17. The support member 95 carries the light sources 20. Alternatively, the support member 95 may be omitted and the light sources 20 may be directly mounted onto the mounting surface 17.

A further support member 91 is provided that extends in a plane perpendicular to the plane of the mounting surface 17 and acts as a support for a portion of the light guide 30 proximal to the light sources 20. For example, the support member 95 and the further support member 91 together may form a T-shaped support member that is attached to the mounting surface 17. Alternatively, a separate support member 91 may be provided that is affixed to the mounting surface 17 in any suitable manner. For example, the mounting surface 17 may form part of an L-shaped profile to which the support member 91 is affixed in any suitable manner, e.g. screwing, clamping, glueing, welding, and so on.

The light guide 30 is positioned on the support member 91 such that the first edge surface 40 of the light guide 30 is optically coupled to the row of light sources 20 on the mounting surface 17, e.g. the first edge surface 40 is brought into contact with the respective light emitting surfaces of the row of light sources 20. The light guide 30 may be kept in position by clamping the light guide 30 between the support member 91 and an L-shaped clamping member 93 positioned on top of the light guide 30 in the orientation of the luminaire 1 as schematically depicted in FIG. 10, which L-shaped clamping member 93 may be affixed to the support surface 17 or the support member 95 in any suitable manner, e.g. using any of the fixation matters as previously described. The respective support members 91, 95 and the clamping member 93 may be made of any suitable material, e.g. a metal such as aluminium, a metal alloy, and so on.

It is reiterated that this fixation method of affixing the light guide 30 against the support surface 17 carrying the one or more light sources 20 is given by way of non-limiting example only and that many suitable fixation methods will be immediately apparent to the skilled person. Any of such fixation methods may be deployed without departing from the teachings of the present invention.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A luminaire comprising:
   at least one optical chamber delimited by a light exit window and a 5 curved reflective surface extending from the light exit window to a mounting surface extending from the curved reflective surface towards the light exit window, each optical chamber comprising:
   a light source mounted on the mounting surface; and a light guide extending across part of the optical chamber, comprising: a total internal reflection major surface facing the light exit window; a further major surface facing the curved reflective surface, said further major surface comprising a light outcoupling portion comprising a plurality of light outcoupling structures; a first edge surface optically coupled to the light source; and
   a further edge surface opposite the first edge surface arranged to direct light towards the curved reflective surface; wherein:
      the optical chamber has a width (W) defined from a light emission surface of the light source to an end point of the curved reflective surface proximal to the light exit window; the light guide has a length (L) between the first edge surface and the further edge surface; a ratio between the width (W) and the length (L) is in a range of 2:15:1; and the light guide is spatially away from the curved reflective surface at a substantial distance (H1) along direction of the mounting surface, wherein the substantial distance (H1) is equal to or larger than thickness of the light guide.

2. The luminaire of claim 1, wherein the further major surface further comprises a total internal reflection portion in between the mounting surface and the light outcoupling portion.

3. The luminaire of claim 2, wherein a ratio of the length (L1) of the light outcoupling portion and the length (L2) of the total internal reflection portion is in a range 1:5-1:30.

4. The luminaire of any claim 1, wherein the light outcoupling structures are prisms such as Fresnel prisms.

5. The luminaire of claim 4, wherein each prism has a width in a range of 1-4 mm and/or a vertex angle in a range of 70-105°.

6. The luminaire of claim 1, wherein the light outcoupling structures are scattering dots.

7. The luminaire of claim 1, wherein the further edge surface 15 comprises a micro lens.

8. The luminaire of claim 1, wherein the further edge surface comprises a freeform surface.

9. The luminaire of claim 1, wherein the further edge surface comprises a slanted surface portion under an angle (θ) in a range of 60-80° with the total internal reflection surface.

10. The luminaire of claim 9, wherein the further edge surface comprises a further 25 slanted surface portion under an angle (α) in a range of 120-160° with the slanted surface portion, the further slanted surface portion extending from the total internal reflection surface and the slanted surface portion extending from the further slanted surface portion to the further major surface.

11. The luminaire of claim 1, wherein: the distance (H1) between the light guide and the curved reflective surface is larger than a distance (H2) between the light guide and the light exit window.

12. The luminaire of claim 1, wherein: the optical chamber has a width (W) defined from a light emission surface of the light source to an end point of the curved reflective surface proximal to the light exit window; the mounting surface has a height (H); and
   a ratio between the width (W) and the height (H) is in a range of 1:1-5:1.

13. The luminaire of claim 1, wherein the light source is a solid state light source.

14. The luminaire of claim 1, comprising a pair of optical chambers separated by a compartment for housing one or more luminaire components, optionally wherein the optical chambers are mirror images of each other.

15. The luminaire of claim 1, wherein the luminaire is a troffer.

* * * * *